United States Patent [19]

Swift

[11] Patent Number: 5,713,649

[45] Date of Patent: Feb. 3, 1998

[54] METHOD OF MANUFACTURING A BOX CONTAINER OR CABINET

[75] Inventor: Kenneth Swift, Christchurch, New Zealand

[73] Assignee: Bremca Industries Limited, New Zealand

[21] Appl. No.: 848,059

[22] Filed: Apr. 29, 1997

Related U.S. Application Data

[63] Continuation of Ser. No. 360,315, Dec. 21, 1994, abandoned.

[51] Int. Cl.⁶ ........................................... A47B 43/00
[52] U.S. Cl. ............................ 312/257.1; 312/265.5; 312/263; 312/348.1
[58] Field of Search ................. 312/257.1, 348.1, 312/348.2, 263, 265.5, 323; 29/428

[56] References Cited

U.S. PATENT DOCUMENTS

| 2,205,826 | 6/1940 | Small | 312/257.1 |
|---|---|---|---|
| 3,341,270 | 9/1967 | Sohl | 312/257.1 |
| 3,410,441 | 11/1968 | Rhyne | 312/263 |
| 3,748,009 | 7/1973 | Stone | 312/257.1 |
| 4,120,551 | 10/1978 | Godtschalck | 312/263 |

FOREIGN PATENT DOCUMENTS

| 2497648 | 7/1982 | France | 312/348.1 |
|---|---|---|---|
| 1429500 | 11/1968 | Germany | 312/265.5 |

Primary Examiner—Milton Nelson, Jr.
Assistant Examiner—Anthony D. Barfield
Attorney, Agent, or Firm—Banner & Witcoff, Ltd.

[57] ABSTRACT

A modular panel fabricated or injection moulded to have a planar face one end of which is stepped to form a rebated end, the edges of the planar face each having a lip formed integrally therewith, the lips adjacent the rebated end also being rebated so that, in use, adjacent similar panels can be fitted together with the rebated end engaged within the lips formed in the other end of the adjacent similar panel. A box, container or cabinet formed from a plurality of similar modular panels as define a together with at least a back panel and hinged door panel. The device also includes a method of manufacturing a box, container or cabinet including the steps of forming a plurality of modular panels as hereinbefore defined;

interlocking four generally similar modular panels together to form the walls of a box, container or cabinet;

joining adjacent modular panels together using fixing members at their corners;

fitting a back panel to the walls; and attaching at least a hinged door to one wall to thereby complete the box, container or cabinet.

8 Claims, 3 Drawing Sheets

METHOD OF MANUFACTURING A BOX CONTAINER OR CABINET

This is a continuation of application serial no. 08/360,315, filed on Dec. 21, 1994 now abandoned.

FIELD OF THE INVENTION

The invention relates to a modular and a method of manufacturing a box, container or cabinet of a plurality of such panels.

BACKGROUND OF THE INVENTION

At present in the manufacture of cabinets for a wide variety of uses, such as in the electrical it has been the common practice to fabricate the cabinet from panels by spot welding the panels together to form the cabinet. Although existing methods are satisfactory, there has been a long felt need for a more flexible system unitary modular panels can be readily built by to form a wide variety of sizes and shape of cabinet.

An object of the invention is therefore to provide a modular panel which can be used to form a of cabinet configurations to users requirements.

Further objects and advantages of the invention will become apparent from the following description which is given by way of example only.

SUMMARY OF THE INVENTION

According to a first aspect of the invention there is provided a modular panel fabricated or injection moulded to have a planar face one end of which is to form a rebated end, the edges of the planar face having a lip formed integrally therewith, the lips adjacent the rebated end also being rebated so that, in use, adjacent similar panels can be fitted together with the rebated end engaged within the lips formed in the other end of the adjacent similar panel.

The lip on one edge of the panel can have a return formed along part of its length, the return having fixing holes near to each end thereof.

According to a second aspect of the there is provided a box, container or cabinet formed a plurality of similar modular panels as hereinbefore defined together with at least a back panel and hinged door panel.

The hinged door panel can be fitted to edge of one of the modular panels by the hinge the subject of New Zealand Design application No. 24331.

The box, container or cabinet further comprises a hinge bracket with at least one part adapted to be fixed to the cabinet, box, container or a wall, at least second part adapted to be fixed to a door panel and a central part joining said part(s) and second part(s), the second part(s) supporting a pivot pin.

The modular panels can include in their lips or front faces sets of holes through which fixing means extend to locate the panels together.

According to another aspect of the invention there is provided a method of manufacturing a box, container or cabinet including the steps of:

forming a plurality of modular panels hereinbefore defined;

interlocking four generally similar panels together to form the walls of a box, or cabinet;

joining adjacent modular panels using fixing means at their corners;

fitting a back panel to the walls; and attaching at least a hinged door to wall to thereby complete the box, container or cabinet.

The fixing means cam be screws, bolts other fixing devices which can be used in combination a strengthening corner gusset.

Further aspects of the invention will apparent from the following description which is by way of example only.

DESCRIPTION OF THE PREFERRED EMBODIMENTS

Figure 1:
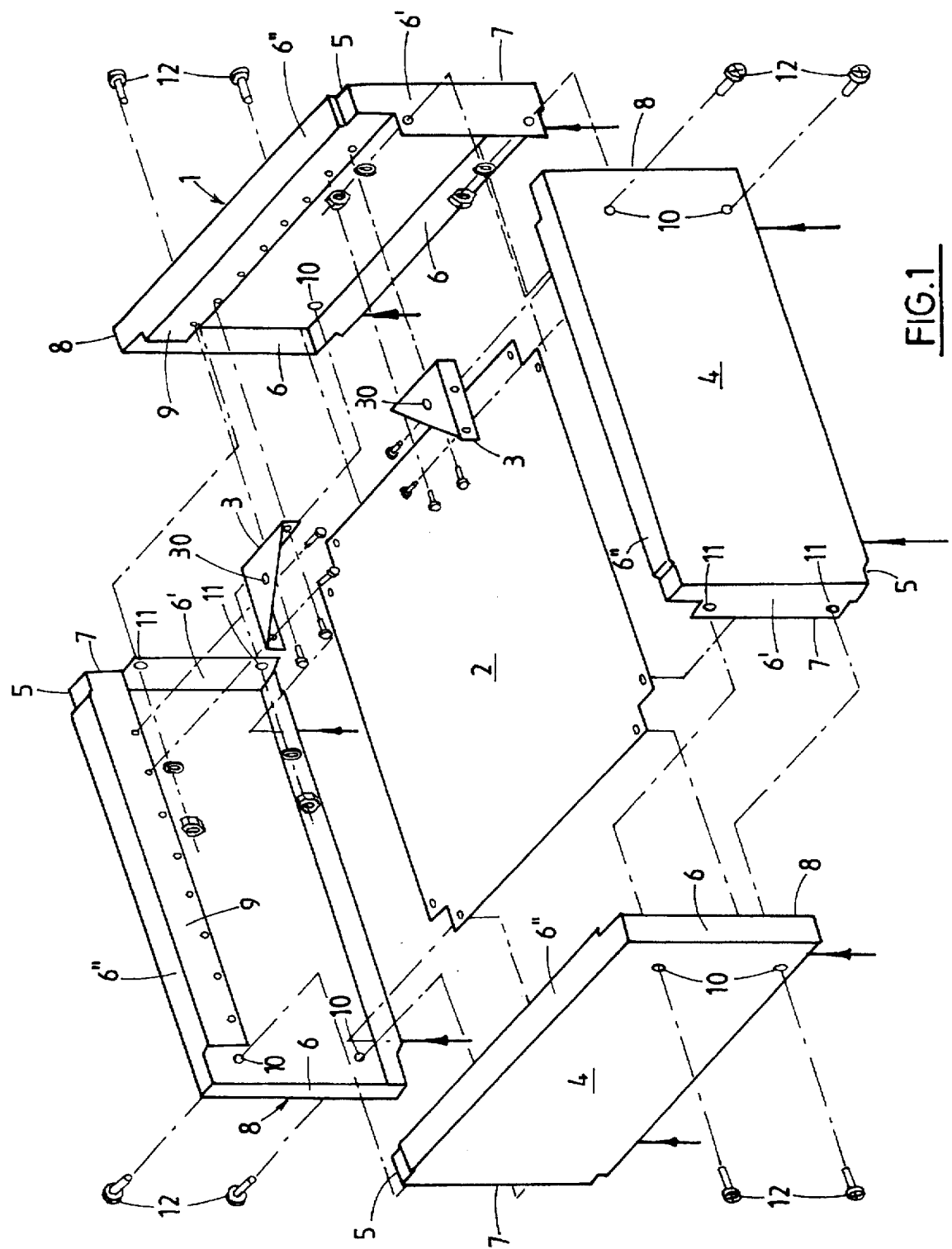
FIG. 1 is an exploded view of four modular panels, a back panel and two fixing clips in their orientation immediately prior to assembly.

The examples of the present invention shown in the drawing are typical panels and a cabinet designed for the installation of electrical equipment. It is however to be appreciated that with minor modifications cabinet (shown in FIGS. 2 to 4) can be used for a wide variety of purposes to suit consumers requirements.

In FIG. 1 can be seen the shape of individual modular panel of which there are four similar panels shown and each is indicated by arrow 1 and these form the walls of a cabinet. Also shown in FIG. 1 is a back plate 2 and corner gusset 3.

Each panel 1 has a planar face 4 at end of which is a rebated or notched region generally by indicated by 5. The four edges of each panel 1 have a lip 6, 6', 6" formed integrally therewith. The lip 6' adjacent the rebate 5 is stepped as is shown to reduce the overall dimensions of panel at this end 7 so that it can slidingly engage with the other end 8 of an adjacent panel.

The lip 6" of at least one of the edges of the panel 1 has formed along part of its length a return or ridge 9. The return 9 has a series of holes (not shown) which assist in engaging adjacent panels together utilising the plate 3 or for attaching fittings (not shown) within a cabinet.

The panels 1 may be provided with a series of fixing holes 10, 11 for example in the front face 10 and the lips 6 to enable fixing means 12 to be used to join the panels 1 together.

As is shown in FIG. 1 the parts are interlocked by inserting the rebated edges 5 into the other ends 8 of the adjacent panels and fixing means 12 are utilised to secure them together.

If required corner gusset plates 3 can be used for added strength.

The depth of the panel can, if desired be altered by attaching adjacent sets of similar panels together to vary both the depth and or height of an assembled cabinet.

Figure 2:
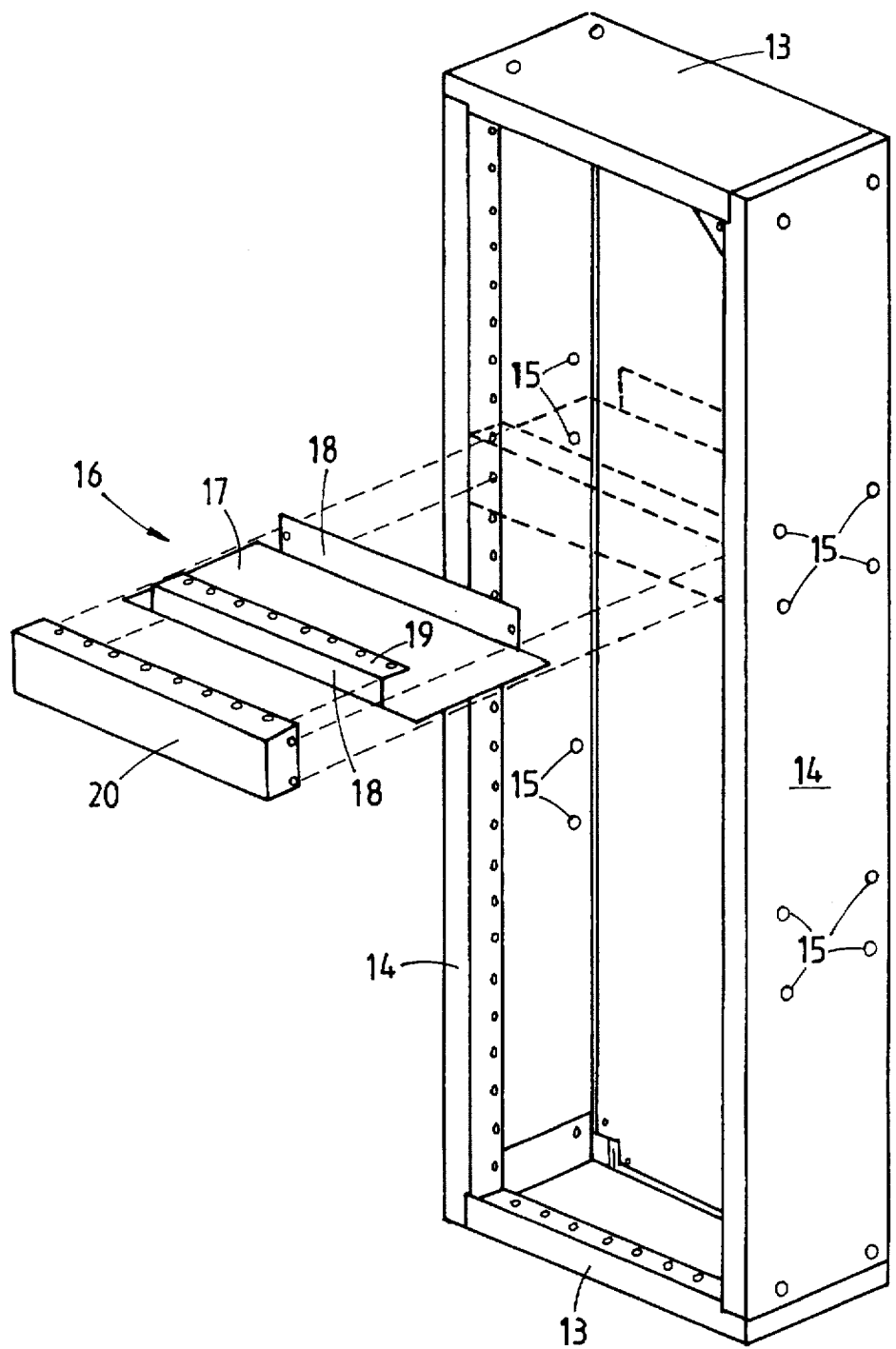
FIG. 2 is a perspective view from the front of an assembled cabinet formed from two pairs of different sized panels in accordance with the present invention and in which a divider comprising an optional mullion and/or barrier plate, which are shown exploded from their stalled position, are fitted.
Figure 3:
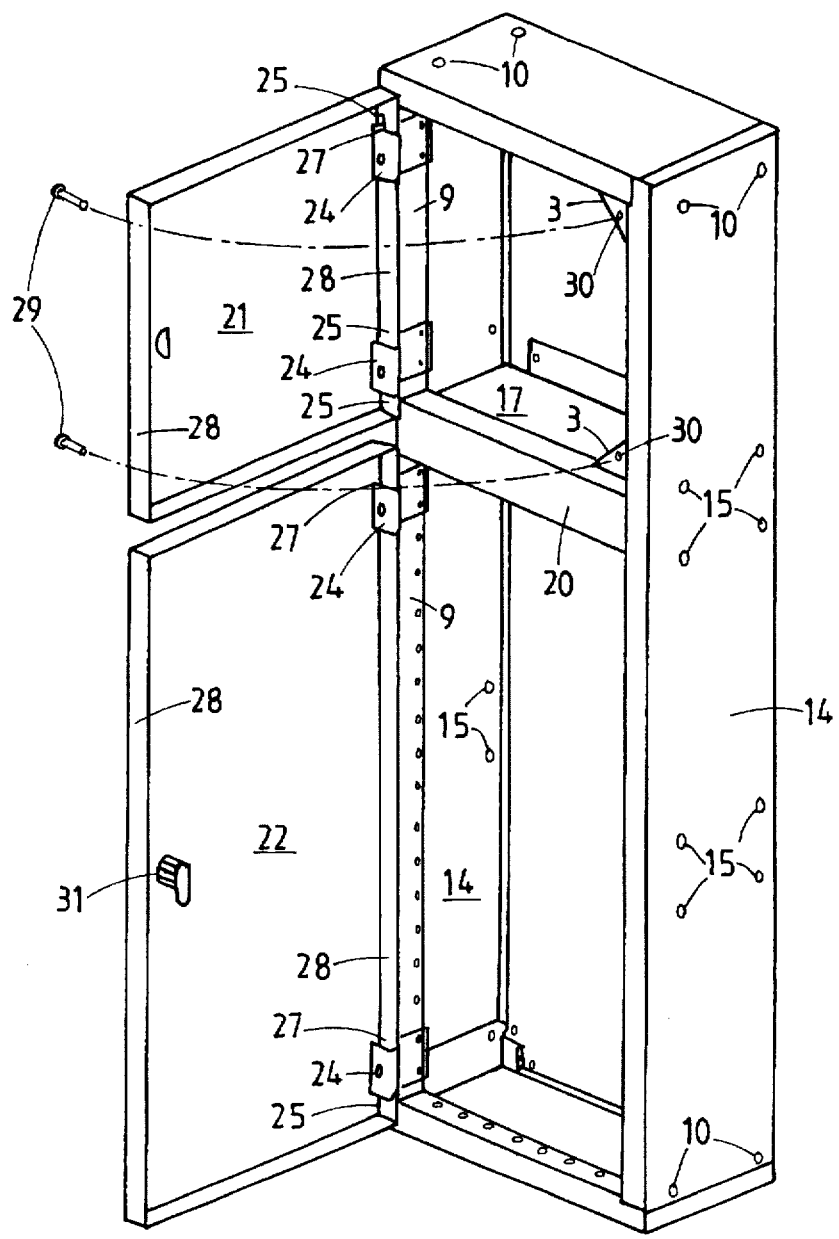
FIG. 3 the cabinet shown in FIG. 2 complete with hinged doors.

An example of an assembled cabinet is shown in FIGS. 2 and 3. In this case the panels 13, 14 forming the top and side walls are of different lengths to suit a users requirements. The longer side panels 14 may be provided with fixing holes 15 as shown for the attachment of other cabinets or flat steel panels used to gland cables to the cabinet. The unit 16 consists of the barrier plate 17 with lips 18 and return 19 so that the holes in the return 19 are for fixing barrier plate 17 onto mullion 20 and for fixing equipment within the cabinet.

The front face 18 of the plate 17 is by a mullion 20 as shown.

Figure 4:
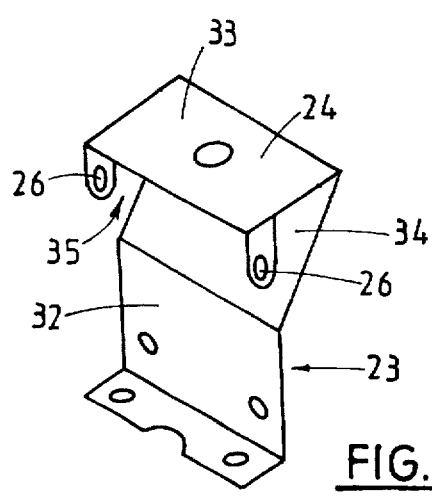
FIG. 4 is a perspective view of a hinged bracket utilised to mount the hinged doors to the cabinet as shown in FIG. 3.

As is shown in FIG. 3 a set of doors and 22 may be attached to the cabinet by utilising the hinge bracket 23 shown in FIG. 4.

The bracket 23 is fixed to the return 9 by fixing screws bolts or rivets (not shown) so that its 24 extends out from the face of the cabinet for the insertion of pivot pins 25 (FIG. 3) which extend through the hole 26 in the bracket 23 and engage with lugs 27 fitted the lip 28 surrounding the door panels 21 and 22. The bracket 23 is folded and has a part 32 which is attached the cabinet wall. The other end of the bracket 23 acts as a second part 33 with holes 26 which support the pivot 25. The part 32 is connected to the part 33 by a central 34 which is angled so that the holes 26 for the pivot pin 25 are positioned so that the door can hinge back the face of the door 21 is in the same plane as the wall of the box. In this position the lip 28 lies in angled region 35 formed in the hinge bracket 23.

The upper door panel 21 shown in FIG. 3 is shown with fixing means 29 for semi-permanently closing this door to the cabinet. A tool is required in order to remove the fixing means 29 which are engaged with locking means (not shown) associated with holes 30 in gusset plates 3.

The other door 22 is provided with an barrel lock 31 used in the usual manner.

Thus by this invention there is a modular panel which can be used to form a multiplicity of cabinet configurations to users requirements.

Particular example of the invention have been described and it is envisaged that improvements and modifications can take place without departing from the scope and spirit of the invention as defined in the following claims.

What I claim and desire to obtain by Letters Patent of the United States is:

1. A modular metal panel comprising a planar member one end of which is stepped to form a notched end, said planar member having a periphery defined by a plurality of edges, each said of the planar member having a lip formed integrally therewith, each lip being substantially perpendicular to the plane of the planar member to extend outwardly from the planar member and its edge, the lip adjacent the notched end being stepped to correspond to the notched end so that, in use, a plurality of said modular panels can be fitted together with the notched end of each modular panel engaged within a said lip formed on another end of an adjacent one of said modular panels.

2. A modular panel as claimed in claim 1, wherein the lip on one of said edges of the planar member includes an inwardly directed flange formed along part of its length, said flange extending generally parallel with said planar member.

3. A modular panel as claimed in claim 2 wherein the flange includes fixing holes.

4. A modular panel as claimed in claim 3 further comprising sets of holes in one or more of the lips and planar member.

5. A structure in the form of one of a box, container or cabinet comprising four modular metal panels, each modular panel including a planar member one end of which is stepped to form a notched end, said planar member having a periphery defined by a plurality of edges each said edge of the planar member having a lip formed integrally therewith, each lip being substantially perpendicular to the plane of the planar member to extend outwardly from the planar member and its edge, the lip adjacent the notched end being stepped to correspond to the notched end so that, in use, a plurality of said modular panels are fitted together with the notched end of each modular panel engaged within a said lip formed on another end of an adjacent one of said modular panels, the structure further having at least a back panel and at least one hinged door panel.

6. A structure as claimed in claim 5, wherein the hinged door panel is fitted to one of said modular panels by a hinge.

7. A structure as claimed in claim 5, further comprising a hinge bracket with at least a first part fixed to one of said modular panels, at least one second part fixed to said door panel, and a central part joining said first part and said second part, the second part supporting a pivot pin.

8. A method of manufacturing a structure in the form of one of a box, a container or cabinet wherein the manufacturing includes the steps of:

(a) providing a plurality of modular metal panels each including a planar member one end of which is stepped to form a notched end, said planar member having a periphery defined by a plurality of edges, each said edge of the planar member having a lip formed integrally therewith, each lip being substantially perpendicular to the plane of the planar member to extend outwardly from the planar member and its edge, the lip adjacent the notched end being stepped to correspond to the notched end so that, in use, a plurality of said modular panels can be fitted together with the notched end of each modular panel engaged within a said lip formed on another end of an adjacent one of said modular panels;

(b) interlocking four of the modular panels together to form walls of the structure;

(c) joining adjacent modular panels together using fixing means at their corners;

(d) fitting a back panel to the walls; and (e) fitting a hinged door to at least one of said modular panels.

* * * * *